US008195006B2

(12) United States Patent
Klemmer et al.

(10) Patent No.: US 8,195,006 B2
(45) Date of Patent: Jun. 5, 2012

(54) METHOD AND DEVICE FOR REPRESENTING A DIGITAL IMAGE ON A SURFACE WHICH IS NON-TRIVIAL IN TERMS OF ITS GEOMETRY AND PHOTOMETRY

(75) Inventors: Thomas Klemmer, Weimar (DE); Oliver Bimber, Giessen (DE); Andreas Emmerling, Weimar (DE)

(73) Assignee: Bauhaus-Universitaet Weimar, Weimar (DE)

( * ) Notice: Subject to any disclaimer, the term of this patent is extended or adjusted under 35 U.S.C. 154(b) by 1212 days.

(21) Appl. No.: 11/661,438

(22) PCT Filed: Aug. 2, 2005

(86) PCT No.: PCT/DE2005/001356
§ 371 (c)(1),
(2), (4) Date: Dec. 4, 2007

(87) PCT Pub. No.: WO2006/024254
PCT Pub. Date: Mar. 9, 2006

(65) Prior Publication Data
US 2008/0095468 A1 Apr. 24, 2008

(30) Foreign Application Priority Data

Aug. 30, 2004 (DE) .......................... 10 2004 042 133
Oct. 23, 2004 (DE) .......................... 10 2004 051 607
Mar. 21, 2005 (DE) .......................... 10 2005 013 428

(51) Int. Cl.
*G06K 9/36* (2006.01)

(52) U.S. Cl. ........ 382/285; 382/162; 382/167; 382/274; 382/206

(58) Field of Classification Search .................. 382/162, 382/167, 274, 206, 285; 345/589, 590, 591, 345/592, 593, 597, 600, 601, 602, 603, 604, 345/605; 348/453; 359/443
See application file for complete search history.

(56) References Cited

U.S. PATENT DOCUMENTS

| 6,340,994 | B1 * | 1/2002 | Margulis et al. | 348/625 |
|---|---|---|---|---|
| 6,804,406 | B1 * | 10/2004 | Chen | 382/254 |
| 7,703,924 | B2 * | 4/2010 | Nayar | 353/7 |
| 2005/0105057 | A1 * | 5/2005 | Matsuda et al. | 353/70 |
| 2006/0063574 | A1 * | 3/2006 | Richardson et al. | 463/1 |

* cited by examiner

*Primary Examiner* — Ali Bayat
(74) *Attorney, Agent, or Firm* — Jordan and Hamburg LLP

(57) ABSTRACT

The invention relates to a method and a device for representing a two-dimensional digital image on a projection surface, whereby at least one projector projects the content of an image buffer onto the projection surface. The aim of the invention is to provide a method and a device which allow to project a digital image onto a background having any surface structure and/or color in such a manner that any influences on the image caused by the background are compensated to the last pixel for at least one special observer perspective. In a special embodiment, definition of the representation is optimized to the last pixel even on an uneven background. For this purpose, the digital image is processed during a rendering step by geometrically distorting it using a two-dimensional pixel-offset field which contains information on the projection surface, and by manipulating the color of the image by means of a two-dimensional surface texture of the projection surface. A least a part of the processed image is rendered in an image buffer and a rectangle is written into the image buffer for initiating the rendering step, thereby compensating scattered light influences. The invention especially relates to a system comprising a plurality of projectors. Definition of representation can be optimized to the last pixel by means of definition values and representation is furthermore possible subject to the observer's position.

40 Claims, 8 Drawing Sheets

METHOD AND DEVICE FOR REPRESENTING A DIGITAL IMAGE ON A SURFACE WHICH IS NON-TRIVIAL IN TERMS OF ITS GEOMETRY AND PHOTOMETRY

BACKGROUND OF THE INVENTION

The invention relates to a method and an apparatus for representing a digital image on a projection surface, and the content of an image buffer being projected onto the projection surface by means of a projector.

In the context of the invention, a projection surface is in principle any desired surface. In particular a projection surface in the context of the invention can be a surface that is non-trivial in terms of geometry and photometry that, for instance, has any desired three-dimensional shape and/or any desired texture. In the context of the invention a projection surface can in particular also comprise a plurality of partial surfaces.

A system is known from DE 102 51 217 B3 for automatic calibration of multiple projector systems that has at least two projectors, one digital camera, and a control unit for controlling the projectors and the camera, automatic calibration occurring with the steps of generation, recording and image filtering of stripe patterns, finding the largest possible common projection surface, calculating the warp fields, and image warping. In this method, a plurality of video projectors are calibrated by using digital camera to record vertical and horizontal stripe patterns that are projected on a projection surface. The stripes are at a constant distance from one another that is selected depending on how complex the geometry of the projection surface is. The stripes are recorded separately for each projector, so that the number of recordings is twice the number of projectors. In addition, an image is recorded in that all of the projectors project a black image. Warping of the projection surface geometry is displayed interpolated between discrete points of a grid, the width of grid cells being determined by the spacing of the stripe patterns, which spacing cannot be reduced as desired.

Pixel-exact warping is not possible with this system. It is furthermore disadvantageous that non-white texturizing or differences in texturizing of the projection surface have a negative effect on the display.

Projecting column/line-coded patterns with phase displacements in order to acquire surface structures is known from Guehring, "Dense 3d surface acquisition by structures light using off-the shelf-components", Proceedings of SPIE: Videometrics and Optical Methods for 3D Shape Measuring, 2001, vol. 4309, pp. 220-231.

Various algorithms and methods have been developed in order to be able to use evaluation of pixel intensities to reach an understanding regarding the definition of an image. Passive autofocus mechanisms in digital cameras use such algorithms, for instance. A series of camera images are generated at different lens settings such that these images are focused differently. Consequently, the lens setting that produces the best-focused recording is the setting whose image has the most pronounced definition. However, precise determination of definition is a function of the number of easily recognizable edges in a depiction of a scene. Recordings of natural scenes, especially in the dark, frequently do not have high contrast and therefore do not have an adequate number of edges. This has a negative effect on the quality of the passive autofocus mechanisms in the cameras.

Conventional projectors can merely be focused on exactly one image plane. If images are projected onto complex three-dimensionally structured surfaces with varying distances, they blur as the distance between the reflection image point and the focused image surface increases. This is true in particular for image details that already have less definition and that are necessary for correct depth perception of the image content. Defocused projection causes them to become even less defined, which distorts the depth perception.

In the prior art, commercially available projectors use so-called structured light in conjunction with an integrated camera to automatically determine general individual definition on flat projection screens for the entire projected image and to adapt the representation in terms of the focus to maximum definition. Similar to the passive autofocus mechanisms in cameras, light bars are projected at different lens settings. The recordings of the built-in camera are evaluated to determine the lens setting at which the definition of the recording is best.

A similar method is described, for example, in Tsai, D. M. and Chou, C. C., "A fast measure for video display inspection", Machine Vision and Applications, Vol. 14, pp. 192-196, 2003. It is used for rapidly determining definition in CRT monitors. With this method, definition can be determined in real time. The monitor provides various binary test patterns. The definition is measured based on the assumption that the less defined the monitor is, the more the portion of bright areas increases, while the portion of dark areas decreases. The method is used on images that are recorded with a camera. The test patterns in the camera image are disassembled in a foreground and a background using the moment retaining principle. The portion of the pixels in the foreground is calculated as the definition.

Such a method merely provides an overall measurement of definition for the entire image. If such a method is used for projectors in order to set a maximum definition by focusing, on an uneven projection surface portions of the image that are outside of the focused image plane will be displayed undefined.

In order to circumvent this problem, planetariums and other virtual reality representations use laser projectors that pass over the projection surface by line and column, instead of conventional lamp projectors, in order to represent defined images on curved projection screens, for instance in domes or cylindrical rooms. Such projectors have great depth of field. They permit defined projections themselves on surfaces that are very geometrically complex when laser projectors are used without lens optics. Such a method is described in Biehling, W., Deter, C., Dube, S., Hill, B., Helling, S., Isakovic, K., Klose, S., and Schiewe, K., in "LaserCave—Some Building Blocks for Immersive Screens", Proc. of Int. Status Conference on Virtual- and Augmented Reality, Leipzig, 2004. It presents a projection method with a combined projection surface, which method compensates the overlapping areas of the images from different projectors such that the projection surface is uniformly illuminated. The system can compensate simple uneven geometries on projection surfaces. Projection onto domed surfaces, for instance, is possible with this method.

However, this solution is extremely costly. The price for a single laser projector is currently 500 to 700 times that of a conventional digital light projector. In addition, the laser projectors used have a major disadvantage. The comprise components that generate laser beams for the RGB color channel and scanner-based projection components that use movable mirrors to deflect the laser beam. Mobile use of laser projectors is therefore very complex.

A few image reconstruction methods are known that combine photography having virtual high depth of field from a plurality of registered recordings with various focused image segments. One of these for instance is Eltoukhy, H. A. and Kavusi, S., "A Computationally Efficient Algorithm for Multi-Focus Image Reconstruction", Proc. of SPIE Electronic Imaging, 2003. It is described therein that the calculation of the absolute gradients of two adjacent pixels is adequate for determining definition. In addition, it is indicated that decreasing the mean intensity of the input image can affect the determination of definition, and thus image reconstruction, by defocusing. It is suggested that the intensity values of the input image be normalized prior to the calculation. The image is reconstructed using a binary decision based on the assumption that a defined recording generates higher gradients than a less defined recording. Thus, an image that is defined everywhere is reconstructed in that the pixel intensity is selected from the input image that has the higher gradient. The definition is determined not only from the gradient of the pixel, but from all gradients of the pixel in a small search window. In this manner measurement fluctuations due to noise can be taken into account. Also it is taken into account that the low definition of a pixel affects the intensities of the adjacent pixel and thus also the reconstruction itself. It is suggested to smooth a binary mask that is created from definitions for decision-making in order to obtain soft transitions between partial images. The smoothed mask thus does not have any affect on the definition quality in the reconstruction.

These methods are not suitable for representing moving contents with active display devices such as projectors.

Also known in the prior art are efforts to intentionally attain artificial lack of definition on projection surfaces in order, for example, to improve the depth perception of projected image contents. Thus the publication by Majumder, A. and Welch, G., "Computer Graphics Optique: Optical Superposition of Projected Computer Graphics", Proc. of Eurographics Workshop on Virtual Environment/Immersive Projection Technology, 2001, describes a method for producing graphic low definition effects by means of overlaid projections from two projectors whose images overlap one another completely but that are focused differently so that one projector produces a defined image while the other simultaneously produces an image with low definition.

The underlying object of the invention is to provide a method and an apparatus with which digital images can be projected onto a background with any desired surface structure and/or color such that the effect on the image caused by the background is compensated in a pixel-exact manner, at least for one special observer perspective. In one special embodiment it should be possible to attain high image definition.

SUMMARY OF THE INVENTION

The object is attained using a method that with the method according to the invention it is possible to correctly project a digital image that can also come from a series of images to be projected sequentially, with one or a plurality of projectors, onto a non-planar surface that is very complex in terms of geometry and that is colored and/or textured in that form and color information for the surface are included in an adaptation of the digital images. The method provides that the digital image is processed during a rendering process in which it is geometrically distorted using a two-dimensional pixel displacement map that contains pixel-exact information about the projection surface and/or the color is manipulated using a two-dimensional surface texture of the projection surface, and in which at least a part of the processed image is rendered into the image buffer. The method is able to process and represent each pixel of the projector or projectors in real-time.

It is in particular advantageous that there is a pixel-exact geometric or color correction of the digital image, that the measurement of the surface geometry and the surface texture of the projection surface and environmental illumination in a calibration can occur fully automatically and pixel-exact, and that the method can be performed with modern computer hardware in the form of pixel shaders at high speed, in particular in real-time.

Advantageously, fully automatic calibration is performed initially in which a calibration image is projected by means of the projector onto the projection surface and the projected calibration image is partially recorded and digitized by means of a camera. The pixel displacement map and the surface texture of the projection surface can be determined using the recorded digitized calibration images.

Preferably, the camera is arranged at an observer position for the calibration. Thus, during the actual representation the observer obtains a projection adapted to his/her position, so that the digital image that was originally to be represented appears to the observer undistorted and correct in terms of color.

It is preferably provided that an associated recorded pixel of a digitized recorded calibration image is identified for at least one projected pixel of a projected calibration image and a two-dimensional geometric displacement between the projected pixel and the recorded pixel is determined and is stored as an element of the two-dimensional pixel displacement map.

The pixel displacement map is determined rapidly and precisely in that a plurality of successive calibration images are at least partially projected and recorded, projected calibration images containing temporally multiplexed stripe patterns, from which recorded pixels associated with pixels to be projected are determined.

Advantageously, if there are a plurality of digitized, recorded calibration images, a mean value of a plurality of two-dimensional geometric displacements belonging to a recorded pixel are determined and stored as an element of the two-dimensional pixel displacement map. Accuracy in the image provided by the pixel displacement map of less than one pixel can be attained this way.

For one particular embodiment, it is provided that at least one test image is projected by means of the projector, whereby images are repeatedly recorded and digitized by means of the camera until the test image is identified in the digitized, recorded images, a latency time being measured between projection of the test image and identification of the test image. The latency time can thus be determined in an uncomplicated manner and can be used for subsequent measurements, which increases reliability thereof.

Preferably, in the case of a single projector, a rectangle with very high intensity white color is projected as the calibration image by means of the projector, the projection surface not being illuminated with environmental illumination, and a recorded calibration image digitized thereby being used as the two-dimensional surface texture of the projection surface. In the case of a plurality of projectors, preferably a rectangle with very high intensity white color is projected sequentially as the calibration image by means of each projector, the projection surface not being illuminated with environmental illumination, and a recorded calibration image digitized thereby being used as the two-dimensional surface texture of the projection surface for the respective projector. This procedure makes it possible to determine the surface texture with few errors and in an uncomplicated manner.

In one preferred embodiment, a black calibration image is projected by means of the projector and is recorded and digitized by means of the camera, this digitized, recorded calibration image being used as environmental illumination texture for the color manipulation. The use of an environmental illumination texture enhances representation quality. For accelerating calibration and also the actual representation, the environmental illumination texture can be neglected or set to a value of zero during the color manipulation.

High representation quality is attained in that a digitized, recorded calibration image used for a surface texture or for an environmental illumination texture is initially distorted into the perspective of the projector using the two-dimensional pixel displacement map and/or an associated pixel displacement texture.

High accuracy for the color and geometry correction is attained in that a lens distortion of the camera is compensated after the digitization of a recording therein by computer.

The representation on prescribed contours can be adapted with little complexity in that recordings of the camera are provided with a mask.

In one advantageous embodiment, the calibration is performed repeatedly, the camera being arranged in a different position for each calibration process, and the pixel displacement map determined for each position is stored as a pixel displacement auxiliary map and the surface texture determined is stored as a surface auxiliary texture allocated to the associated position. This makes it possible to take into account a plurality of potential observer positions. The values determined can be stored so that they are available for later selection. Thus the observer position can be changed and the representation can be optimized for one of a plurality of observers. Any definition values determined do not have to be re-determined. They are not a function of the observers perspective since they relate merely to the positions of the projectors.

For one particularly preferred embodiment, it is provided that a position of the observer is determined dynamically prior to the geometric distortion and color correction and the pixel displacement map and the surface texture are determined using the pixel displacement auxiliary maps determined for the different camera positions and the position determined for the surface auxiliary textures. In this manner the observer position can be changed during the representation without recalibration.

Preferably the pixel displacement map is determined in that there is weighted interpolation between the pixel displacement auxiliary maps determined for the different camera positions, and the surface texture is determined in that there is weighted interpolation between the surface auxiliary textures determined for the different camera positions. In this manner a precise color and geometry correction for the representation can be attained even for an observer position that was not previously calibrated.

In the following, in the sense of the invention, instead of definition values it is possible to use lack-of-definition values or focus error values or similar equivalents with a corresponding inversion or change in the selection or weighting conditions for the manipulations.

The representation of a plurality of digital images on one projection surface is accomplished with high overall definition in that contents of appropriate image buffers that contain intensities, to be projected, of pixels are projected in areas of the projection surface by means of a plurality of projectors that are set for different image planes, whereby for one image point of the projection surface onto which point a plurality of pixels are simultaneously projected from different projectors, the intensities to be projected for these pixels using the respective projectors are manipulated using definition values for the individual respective pixels. By manipulating the intensities, the definition of the representation, and thus the best possible of the local definitions from the different projections, can be selected or combined by pixel.

Advantageously, the manipulation is performed by means of at least one pixel shader. This makes it possible to perform the method rapidly and thus to represent moving image contents with high overall definition in real time. A texture that contains the definition values can usefully be used as parameter texture for the pixel shader, which simplifies the method.

In a first embodiment of the method the manipulation occurs in that, of a plurality of pixels that can be projected from different projectors onto the same image point of the projection surface, the intensity of those with the highest definition value remains unchanged, while the rest of these pixels are darkened. This exclusive/alternative projection of the pixels represents a simple, rapidly performable embodiment.

A second alternative embodiment provides that the manipulation occurs in that the intensities of a plurality of pixels that can be projected from different projectors onto the same image point of the projection surface are scaled in a weighted manner using to their definition values. This weighted projection enables a better representation without optical artifacts, but with more light intensity. This is advantageous, in particular, for projection surfaces with less diffuse reflectivity.

For one preferred embodiment it is provided that the definition values of the pixels are determined in a calibration process, for which purpose a calibration pattern is projected successively by means of each projector and the projections reflected by the projection surface are recorded in appropriate calibration images by means of a camera. With this method it is possible, with low complexity, to determine relative definition values between the pixels of the projectors that are adequate for the intensity manipulation. Absolute definition values are not necessary.

Particularly preferred is an embodiment in which in one of the recorded calibration images an intensity of a pixel is normalized a first time in that it is placed in relation to the intensity of the corresponding pixel in the projected calibration pattern. A more precise, because consistent, determination of the definition values is enabled in this manner. Since the projected intensities in the reflection are mixed with the surface reflectivity, the definition values determined in this manner are independent of the surface reflection of the projection surface. In addition, because of this method step, the normalized intensities are independent of the form factor of the projector, which is determined by its orientation to and distance removed from the projection surface. A calibration image normalized for the first time in this manner from ratio factors can be used as independent intensity distribution for determining the definition values. The distribution of the ratio factors behaves like the intensity distribution in the camera image.

Advantageously, a plurality of intensities that have been normalized for the first time and that are from a calibration image are normalized with one another a second time. This can achieve more precise definition values in that maximums of the Gauss distributions and distributions that are similar thereto that are present in the intensities that were normalized the first time are raised to a value of 1.0, the other intensities being scaled with the same factors. In this manner deficiencies in the projector and camera such as limited brightness, dynamics, response function, and noise can be reduced.

Particularly preferred is an embodiment in which a definition value is determined from normalized intensities of a calibration image by means of image decomposition using the moment retaining principle. This embodiments enables high speed and accuracy for the method. Other less exact and slower options include determining the definition values using the losses in intensity in the normalized calibration images, a frequency shift for instance in accordance with the fast Fourier transform or discrete cosine transform, a gradient analysis with a Sobel or Laplace filter, or from a statistical analysis of the intensity distribution.

Advantageously, the image decomposition is performed within a two-dimensional scanning segment of the associated calibration image. This enables rapid analysis. A plurality of image points in the same calibration image can be evaluated in parallel.

High, adjustable accuracy in the method is attained in that the calibration pattern for one projector is displaced in multiple steps and an associated calibration image is recorded after each step. For this, the step width and number of steps can be prespecified. A definition value can be determined for each pixel in the camera space using one step width from one pixel. An alternative is for instance interpolation between points analyzed with larger step widths. Another alternative provides that the definition value of the central pixel is assigned to all pixels in a scanning segment. These alternatives render the method simple and rapid to perform, but less precise.

In one preferred embodiment, a matrix of circular points is used for the calibration pattern. Due to their radial symmetry, circular points permit simple and rapid determination of the definition values in multiple directions simultaneously. Alternatively, horizontal and vertical stripes for instance can be used for calibration patterns, the definition values being determined separately in the horizontal and vertical directions. Then the definition values for the two directions can be averaged, for instance, the mean value then being used as a common definition value. Horizontal and vertical definition values could continue to be treated and used separately for the rest of the entire method, separate selection and weighting conditions being used for the manipulations.

Advantageously, the calibration pattern is corrected in terms of geometry and/or color with respect to the properties of the projection surface individually for each projector before the projection. The geometry correction causes a calibration image to be reproduced on a uniform scale and the calibration pattern to be oriented therein precisely in relation to the camera image axes, in particular with parallel axes, which simplifies and accelerates the analysis. The color correction causes the calibration pattern in the calibration image to have an intensity that is independent from the form factor of the respective project and from the colors or material of the projection surface so that essentially only the intensity broadening due to the defocusing remains for analysis.

In one advantageous embodiment, during color manipulation mutual illumination of different projection surface segments is compensated by form factors corresponding to various projection surface segments. This compensation is preferably performed iteratively, an intensity to be projected onto a projection surface segment being determined using a reflected scatter intensities.

The invention is explained in the following using exemplary embodiments.

DETAILED DESCRIPTION OF THE INVENTION

Figure 1:
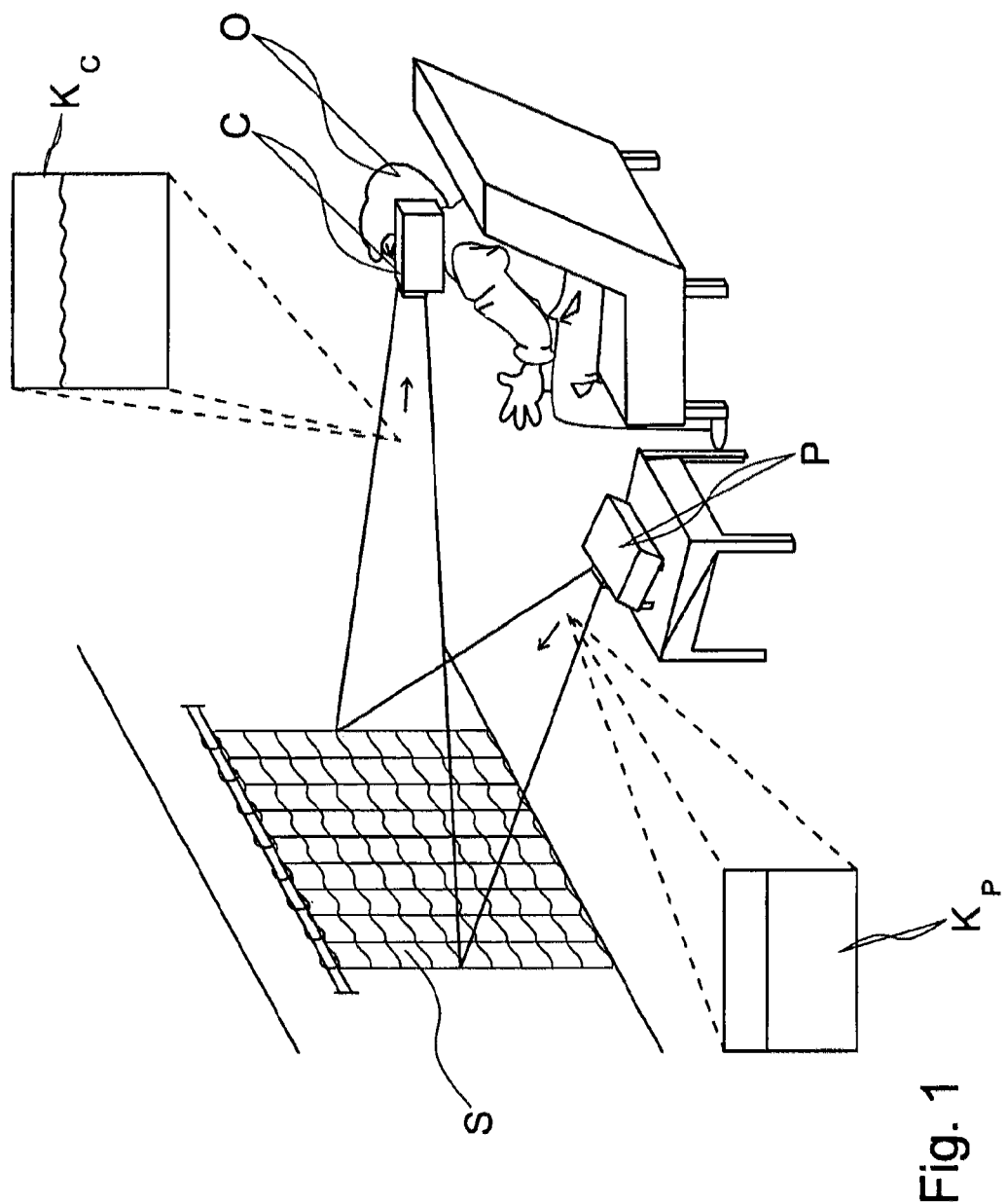
FIG. 1 is a schematic depiction of the inventive apparatus during calibration.

FIG. 1 depicts an apparatus during the automatic calibration process. The projector P in the form of a digital LCD light projector that for instance has XGA resolution has a fixed focus and is arranged such that it illuminates the projection surface S. Any desired digital projectors can be used, for instance even laser projectors. The projector P can be arranged in any desired position with respect to the projection surface S. The projection surface S is a wavy drape in front of a patio door, that is, it has complex geometry. The projection surface S furthermore has a complex texture because it has different colored horizontal stripes. Temporarily arranged for calibration at about the position of the eyes of an observer O is a camera C for instance in the form of an analog or digital videocamera that maps the projection surface S and digitizes the recorded images. The camera C is connected to a control unit (not shown) in which the recorded images digitized by means of the camera C can be processed. The projector P is also connected to the control unit, whereby an image to be projected can be transferred from the control unit to the projector P. The control unit is also connected to a DVD player (not shown) that delivers to the control unit digital images Z that are to be represented on the projection surface S after the calibration process. Any image-producing source such as a videorecorder, camcorder, or computer can be used instead of the DVD player. Additionally, a computer can play back in particular computer animation or provide a user interface.

During the calibration process, in a variation of the line/column coded pattern projection method with phase shifts, temporally multiplexed stripe patterns are represented in a number of projected calibration images $K_P$ and acquired in associated digitized, recorded calibration image $K_C$. Using the differences between the projected calibration images $K_P$ and the associated digitized, recorded calibration images $K_C$, a pixel displacement map D is determined that allocates each pixel from the observer perspective, that is, the camera, to a projected pixel from the projector. For visualization purposes, at the point in time illustrated in FIG. 1a calibration image $K_p$ is projected, by means of the projector P, that contains a single horizontal line. Due to the wavy geometry of the projection surface S, this line appears as a wavy line from the observer perspective and thus in the digitized, recorded calibration image $K_C$. The distortion of the line pixels determined in this manner is stored in the pixel displacement map D.

Figure 2:
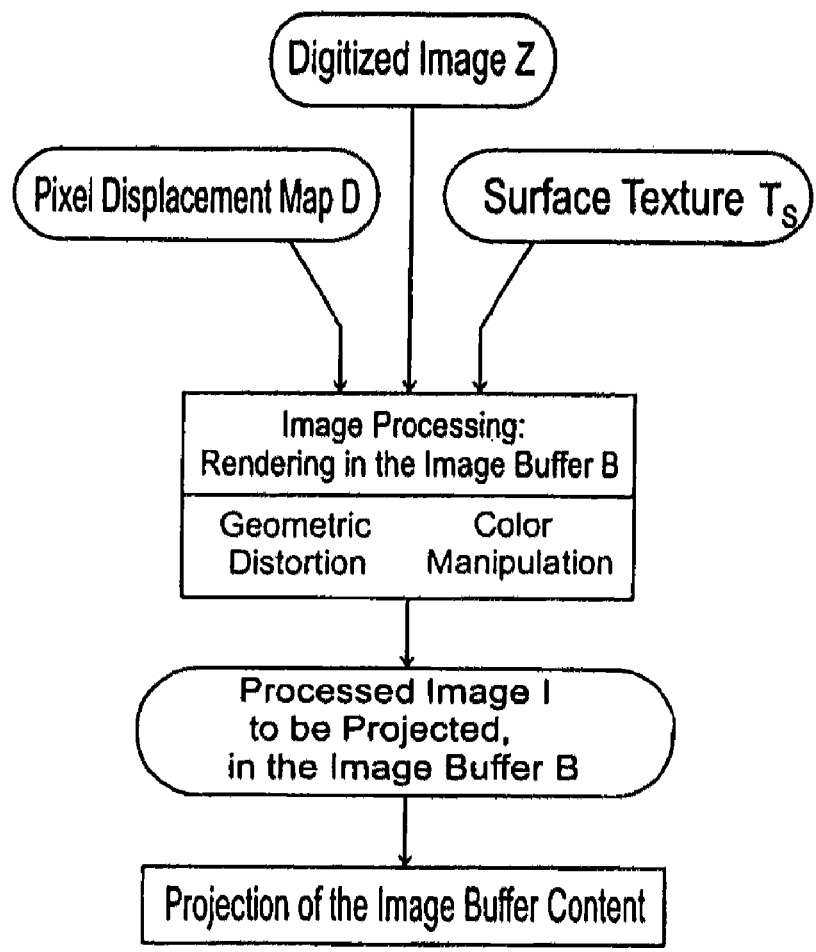
FIG. 2 is a schematic depiction of the method.

FIG. 2 schematically describes the course of the representation method in an arrangement that matches that described for instance in FIG. 1. In an image processing step, within a control unit a digital image Z to be represented is geometrically distorted and manipulated in terms of color using a two-dimensional pixel displacement map D and using a surface texture $T_S$ of the projection surface S. The pixel displacement map D and the surface texture $T_S$ originate from a calibration process performed previously. The geometric distortion using the pixel displacement map D occurs such that the pixels of the digital image Z are offset such that from the observer or camera perspective the digital image Z appears projected onto a virtual, flat surface. Preferably the geometric distortion is performed by means of a pixel shader, since in this manner the image processing occur in real time. The color manipulation using the surface texture $T_S$ of the projection surface S occurs such that the colors and/or pattern of the projection surface S appear as neutralized as possible so that the digital image Z appears projected on a white surface. During the processing step, the processed image is rendered in an image buffer B. It is then projected therefrom by means of the projector P.

Since both the geometric distortion and the color manipulation are performed in the processing step, the digital image Z appears from the observer or camera perspective to be projected onto a virtual, flat white surface. The observer thus hardly perceives distortions due to uneven geometry of the projection surface S and hardly perceives untrue colors due to the projection surface S having a non-white color and/or texture. It is also possible in the method to perform only the geometric distortion or alternatively to perform only the color manipulation. For instance, if the projection surface is white and uneven, only the geometric distortion is necessary. Also, for weak colors, for instance light pastel shades, geometric distortion alone is adequate. On the other hand, if the projection surface is flat but has a non-white color and/or textures, only the color manipulation is required.

Figure 3:
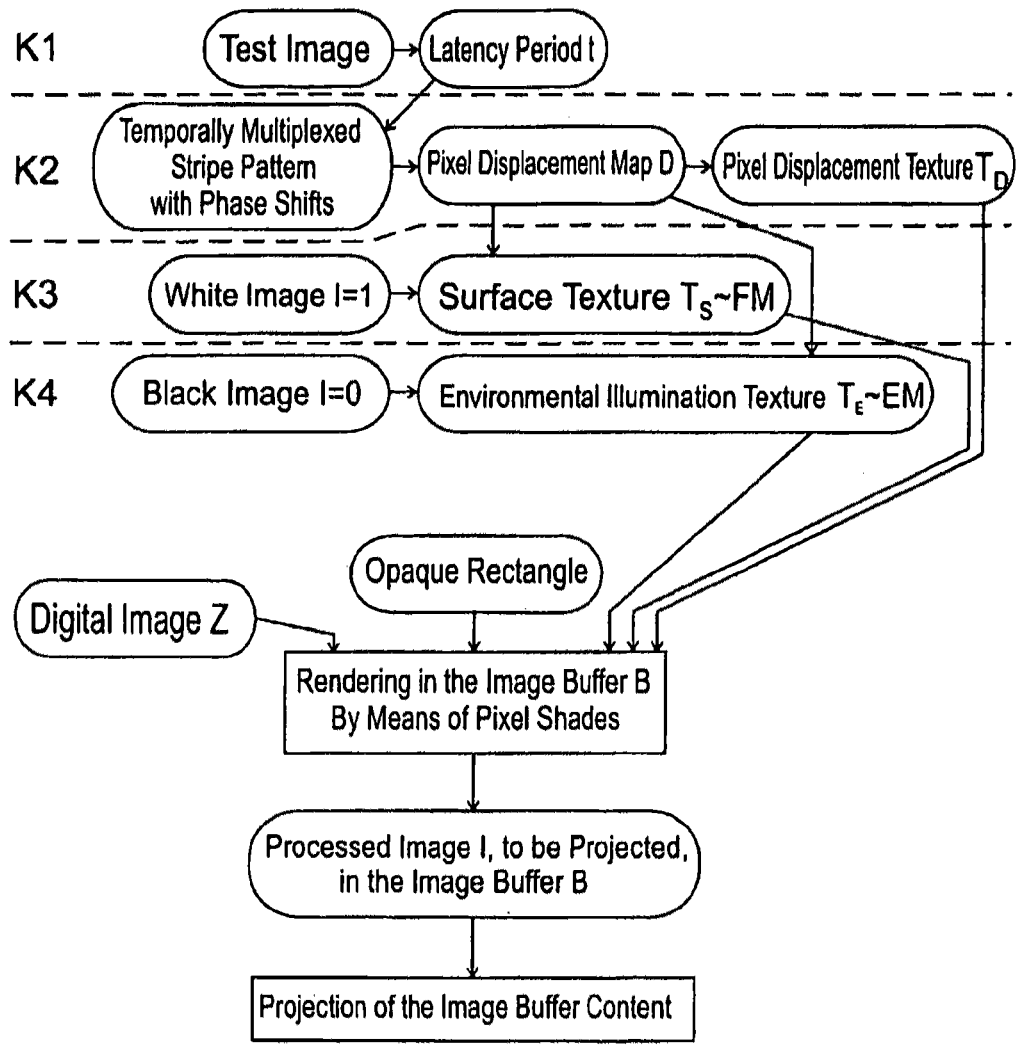
FIG. 3 depicts the method in an expanded embodiment.

FIG. 3 schematically depicts a more complex representation method for an apparatus, for instance in accordance with FIG. 1, including automatic calibration. First the calibration process is usefully performed. For this, an observer O must merely attach a camera C in the provided observer position and leave it in this position during the calibration. If the projection surface is only to be partially illuminated, the observer O can, using a mask in an image of the projection surface S recorded by means of the camera C in the observer position, establish a limitation for a virtual projection surface within which the projection should occur. All pixels outside of the limitation are set to black after the digitization of all subsequent recordings so that during the calibration no projection into these areas is recognized. Consequently, no projection into these areas will occur in the regular method steps, either. If no limitation or mask is established, the visual field of the camera C is automatically used as the limitation. Then the observer can initiate the automatic calibration. Its course is described in the following. All recordings for camera C are automatically pre-rectified in order to compensate a radial lens distortion of camera C.

In a first calibration step K1, a test image is projected onto the projection surface S by means of the projector P and images on the projection surface are repeatedly recorded with the camera C until the test image in the recorded images is identified. The time span from projection to identification is measured as latency time t and is taken into account in all follow-on calibration steps during the recording of images. For enhancing accuracy, a plurality of time measurements using a plurality of test images is also possible. A test image is usefully constructed such that it is even identifiable if irregular structures, severe distortion, and major color differences are present. It is appropriate to perform the calibration while excluding environmental illumination with darkening in order to enable certain identification of the test image or images. Darkening is also required in a later calibration step, therefore it is useful to perform darkening even prior to the calibration process.

Figure 4A:
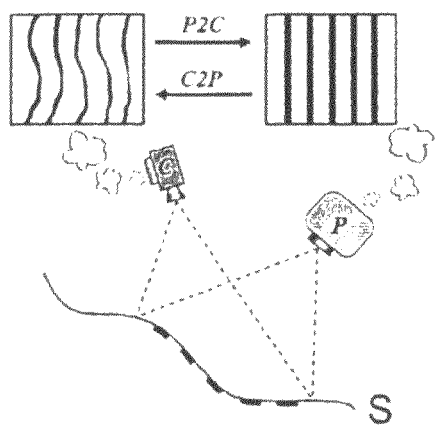
FIG. 4 includes schematic representations of the geometry and color correction.

In a second calibration step K2, illustrated in FIG. 4a, temporally multiplexed stripe patterns are projected by means of the projector P in a variation of the line/column coded pattern projection method with phase shifts in calibration images $K_p$ and are recorded and digitized in associated calibration images $K_C$ by means of the camera C. Using the differences between the projected calibration images $K_p$ and the associated digitized, recorded calibration images $K_C$, first a C2P allocation image is created that allocates to each pixel in the observer perspective, that is, camera C, a pixel from the projection P. From this, by creating the inverse map, a two-dimensional pixel displacement map D is determined that allocates each pixel from the observer perspective, that is camera C, to a projected pixel of the projector P. The pixel displacement map D can also be called a P2C allocation map. It has the same resolution as the projector P. Due to different resolutions of camera C and projector P and due to their different distances from the projection surface S, the pixel displacement map D does not represent a one-to-one pixel allocation. In an extreme case the pixel displacement map D can be incomplete if parts of the projection surface S are in the shadow of raised structures. However, this can be avoided using a plurality of projectors that project from different directions. Moreover, it is possible for a plurality of different projected pixels from the stripe pattern to be mapped on the same camera pixel due to the geometric structure of the projection surface S. Therefore means of the geometric displacements are calculated and stored in the pixel displacement map D. In this manner an accuracy of less than a pixel is attained. The pixel displacement map D permits each pixel of the projector P to be mapped from the projector's perspective to the observer perspective of the camera C. This results in an undistorted perspective, without it being necessary for the three-dimensional shape of the projection surface S to be known. The pixel displacement map D is converted, preferably by means of a P buffer, into a pixel displacement texture $T_D$ that in the further course of the method can be used for automatically distorting an image into the undistorted perspective as parameter texture of a pixel shader. Then, in the pixel displacement texture $T_D$, references from each pixel from the projector P are stored to an associated pixel of the digital image Z and to an associated pixel of the camera C. For instance, the references to the pixels of the digital image Z are stored in the form of their horizontal and vertical coordinates in the red and green channels and the references to the pixels of the camera C are stored in the form of their horizontal and vertical coordinates in the blue and alpha channels.

Warping (distorting) in real time using so-called "pseudo pixel displacement mapping" is possible by means of pixel shaders in later method steps with the pixel displacement texture $T_D$ used for parameter texture. For this, in such a later method step an image Z to be distorted in the form of a texture is provided to the pixel shader as another parameter texture. To initiate rendering, for instance a single two-dimensional rectangle is written into an image buffer B connected to the pixel shader. The rendering includes using the pixel shader to include gridding each projector pixel into the image buffer B using the pixel shader. The colors of the incoming pixels are overwritten with new colors that result from the corresponding pixels of the image Z to be distorted. These pixels are automatically determined by the correspondingly programmed pixel shader using the coordinates contained in the pixel displacement texture $T_D$ to the respective projector coordinates from the digital image Z. The effect is a specific displacement of pixels from the projector perspective of the image to be distorted to a new position within the image buffer B so that the pixels can be perceived correctly after being projected from the perspective of the camera C. This distortion does not require any additional geometric information about the projection surface S.

Figure 4B:
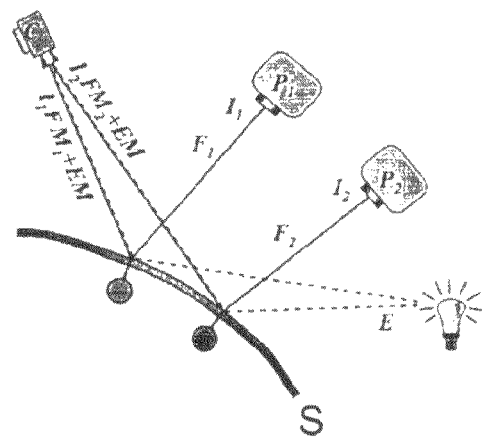

If light strikes a surface, only a portion of its original intensity and color is reflected, whereas the rest is absorbed. In the case of Lambert surfaces, which reflect completely diffusely, the intensity and color of the reflected light are highly dependent on various parameters such as the material color M of a surface location, a light intensity I to be projected that is of a spectral component of a light source, that is, a projector P, and the distance and angle of incidence relative to the surface, which together represent the so-called form factor F. In the case of perfectly diffuse surfaces, Lambert's Law describes the intensity of diffusely reflected light R for each spectral component: R=IFM, F=$\cos(\alpha)/r^2$. Apart from the light of a videoprojector, environmental illumination E is subject to the same processes that are composed of, assuming additive color mixture to the total intensity of a spectral component of the reflected light, R=EM+IFM. FIG. 4b explains this graphically.

By projecting a corresponding image in light intensity I to be projected according to pixel, the composition can be neutralized, which in the context of the invention is called color correction or color manipulation, so that a visual impression according to the reflected intensity R occurs in the form of a desired image Z in its original colors. For this, the equation for 1 is solved: I=(R−EM)/FM. The products of EM and FM can be found by means of the projector P and the camera C. A variable proportional to the product FM is found under darkened environmental illumination E=0 in that an image I=1 is projected with highest light intensity of the projector P and recorded by means of the camera C. A variable proportional to the product EM is recorded with the provided environmental illumination E and black projector image I=0. The intensities of the digital image Z to be represented are used, separated according to color channels, as reflected intensity R. This requires that projector P and camera C are matched in terms of color and intensity and that automatic brightness control, automatic focus, and automatic white compensation for camera C are turned off. The required parameters can be determined with these simple assumptions without complicated measurements and without additional equipment. In order to reach a correct calculation without distortion due to the geometrical structure of the projection surface S, the recorded variables EM and FM are distorted into the projector perspective prior to their further use by means of the pixel displacement map D or the pixel displacement texture $T_D$.

In a third calibration step K3a, for determining the variables necessary for such a color correction by means of the projector P, a white calibration image $K_p$ is projected with the highest available brightness and an associated calibration image $K_C$ is recorded by means of the camera C and distorted according to the pixel displacement map D already determined and/or according to the geometry of the projection surface S using the pixel displacement texture $T_D$ and stored as parameter texture is usable surface texture $T_S$ of the projection surface S, which represents the parameter FM. In a fourth calibration step K3b, under provided environmental illumination by means of the projector P, a black calibration image $K_p$ is projected, recorded, digitized, distorted according to the geometry of the projection surface S using the pixel displacement map D already determined and/or using the pixel displacement texture $T_D$ and stored as environmental illumination texture $T_E$, which represents the parameter EM.

This ends the automatic calibration. The camera C can be removed, since it is no longer required if the geometric and illumination conditions remain constant. Given XGA resolution is 1024×768 pixels and PAL camera resolution is 720×576 pixels and maximum latency time t for the camera is 80 ms and mean image processing duration is 150 ms, the automatic calibration takes about 28 s. Observer interaction is not required.

Representation occurs in two steps S1 and S2 after calibration, and these steps can be repeated in this sequence as often as desired, whereby a static digital image Z or a continuous sequence of digital images Z can be used. Since real time image processing is possible, this can, for example, be a film or animation.

In step S1, first the required parameter textures are transferred to the pixel shader. These are the pixel displacement texture $T_D$, surface texture $T_S$, environmental illumination texture $T_E$, and digital image Z in the form of a texture. Writing a white rectangle to the image buffer B initiates a separate rendering process for each color channel. During the rendering, the digital image Z is geometrically warped (distorted) using the pixel displacement texture $T_D$ by "pixel displacement mapping" in the manner described in the foregoing for the calibration. In addition, the displaced pixels are color corrected or manipulated in terms of color by the pixel shader using the equations described in the foregoing. The observer O can make fine manual adjustments to the prespecified color and brightness values, in particular for gamma correction, by means of the pixel shader. In addition, extreme intensities can be prevented by means of appropriate programming of the pixel shader in order to avoid visible artifacts.

The rendered image is then located in the image buffer B as image I to be projected and in step S2 is projected onto the projection surface by means of the projector P.

On the one hand, the display quality can be improved by using a plurality of projectors $P_i$, in particular in the case of a colored and/or textured projection surface S. The projectors $P_i$ can add to their maximum light intensity and/or illuminate shadow areas of one or a plurality of other projectors $P_i$. The illuminated areas of the projectors $P_i$ can overlap one another or each illuminate one part of the projection surface S completely independently. Tiling the projected images I can attain a resolution that a single projector P is not capable of producing. A plurality of projectors $P_i$ does not increase the complexity of automatic calibration for the observer. The duration of calibration increases largely linearly with the number of projectors $P_i$. During calibration, one pixel displacement map $D_i$, one pixel displacement texture $T_{Di}$ therefrom, and additionally one surface texture $T_{Si}$ is determined for each projector. In this manner pixels can be mapped from the observer or camera perspective to the perspective of each projector $P_i$ such that they are projected precisely onto the same location on the projection surface. For N projectors $P_i$, the individual light intensities on one surface location in one spectrum component add up to the total reflected intensity R=EM+$I_1F_1M+\ldots+I_NF_NM$. Assuming that the projectors $P_i$ radiate the same intensity, each intensity $I_i$ of a projector $P_i$ to be projected can be calculated from:

$$I_i=(R-EM)/(F_1M+\ldots F_NM),$$

because given this, then $$R=EM\,I_i(F_1M+\ldots+F_NM).$$

This corresponds to a single, virtual, strong projector P.

Although each projector $P_i$ radiates the same intensity, different form factors $F_i$ cause different striking intensity sections. These sections are added together on the projection surface S and result in the reflected intensity:

$$R = EM + I_1 F_1 M + \ldots + I_N F_N M = EM + (R-EM)/(F_1 M + \ldots + F_N M)(F_1 M + \ldots + F_N M).$$

As in the case of an individual projector P, the image I to be projected is calculated in real time by means of one or a plurality of pixel shaders to which the parameter textures are transferred for the variables EM, $F_1 M, \ldots, F_N M$ after projector-dependent warping by means of the pixel displacement map $D_i$ belonging to the respective projector, or by means of the respective pixel displacement texture $T_{Di}$ as environmental illumination texture $T_E$ or as surface textures $T_{Si}$. The variables $F_i M$ can be determined in two ways. Either by sequentially projecting and recording an image $I_i=1$ of highest intensity for each individual projector $P_i$ one after the other or by recording a projected image I that is proportional to $F_1 M + \ldots + F_N M$, in that for this images $I_i=1$ of highest intensity are projected simultaneously by means of all projectors $P_i$. Although the second procedure is more compact, it can lead to overcontrolling the camera C. Shadow regions of individual projectors $P_i$ are included in the form factor variables and are automatically removed as a secondary effect. For this each area of the projection surface S that is to be illuminated must be able to be illuminated by at least one projector $P_i$. Uniform transitions between the projections of a plurality of projectors $P_i$ are possible with conventional cross-fading techniques.

It is also always possible to do this by means of one or a plurality of main processors instead of using one or a plurality of pixel shaders.

In order to attain high representational fidelity, the projector or projectors $P_i$ and the camera C are usefully equalized for color and intensity prior to the automatic calibration. Overcontrolling can be avoided in this manner.

Figure 4C:
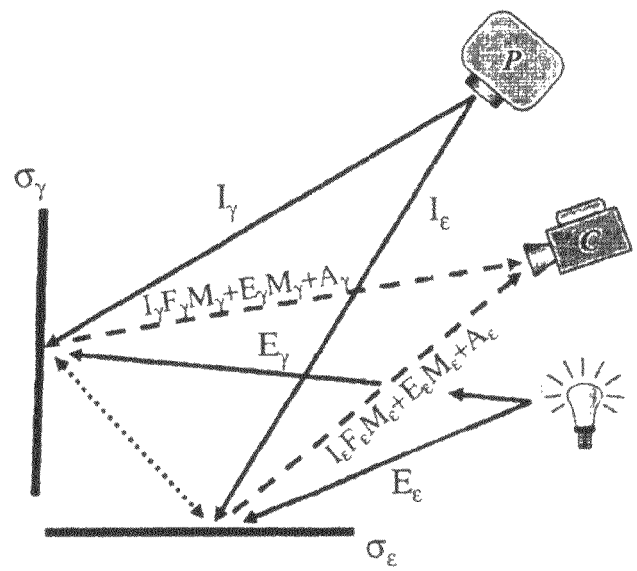

In accordance with FIG. 4c, a light beam of an intensity $I_\gamma$ that is projected by a projector P onto a projection surface segment $\sigma_\gamma$ is diffusely reflected in the projection surface segment $\sigma_\gamma$, so that a portion of the projected intensity $I_\gamma$ is radiated onto a different projection surface segment $\sigma_\epsilon$. Because of this, a reflected scatter intensity $A_\epsilon$ travels, in addition to the intensity $I_\epsilon$ multiplied by the form factor $F_\epsilon$ and the material color $M_\epsilon$ and projected onto the projection surface segment $\sigma_\epsilon$, and the environmental illumination $E_\epsilon$ multiplied by the material color $M_\epsilon$, from the projection surface segment $\sigma_\epsilon$ into the camera C or into the eyes of an observer O. A corresponding process takes place mutually between all possible illuminated projection surface segments $\sigma_\gamma(\gamma=1 \ldots \mu)$ and has a negative effect on the representation quality.

In order to compensate for the mutual indirect illumination, in one advantageous embodiment the intensity $I_\gamma$ to be projected onto a projection surface segment $\sigma_\gamma$ is determined using segment-wise and color channel-wise solution of the equation $$I_\gamma = \frac{1}{F_\gamma M_\gamma}\left(R_\gamma - E_\gamma M_\gamma - \sum_{h=1, h\neq\gamma}^{h} A_\gamma^h\right),$$

preferably by means of numeric, iterative approximation, the reflected scatter intensities $A_\gamma^h$ being determined recursively in $h^{th}$ scatter order in accordance with:

$$A_\gamma^h = \sum_{\epsilon,\epsilon\neq\gamma}^{\mu} S_\epsilon^{h-1} F_{\epsilon\gamma} M_\gamma$$

where $$A_\gamma^1 = \sum_{\epsilon,\epsilon\neq\gamma}^{M} (I_\epsilon F_\epsilon M_\epsilon + E_\epsilon M_\epsilon) F_{\epsilon\gamma} M_\gamma,$$

whereby the $F_{\gamma\epsilon}$ are mutual form factors for the mutual illumination of two projection surface segments $\sigma_\gamma$, $\sigma_\epsilon$.

The starting point for each iteration step is a direct illumination in the form of an intensity $I_\gamma$ to be projected. The starting point for the first iteration is calculated analytically for all projection surface segments $\sigma_\gamma$ uniformly in accordance with $I_\gamma=(R_\gamma-E_\gamma M_\gamma)/F_\gamma M_\gamma$ in the manner described above. In each iteration step, reflected scatter intensities $A_\gamma^h$ are calculated using the respective starting point by means of the aforesaid relationships and thus another intensity $I_\gamma$ to be projected is determined as starting point for the next iteration step. The iteration is terminated when the determined intensity $I_\gamma$ to be projected satisfies a prespecifiable convergence criterion. The above equations are preferably calculated by means of at least one pixel shader to which the mutual form factors $F_{\gamma\epsilon}$ are transferred as parameter textures. The iteration is performed using a plurality of representation processes, one iteration step occurring during the rendering of each representation process. For instance, the projection surface S is divided into projection surface segments $\sigma_\gamma$ with a size of 128×128 pixels. All of the parameter textures are scaled down from the projector resolution to the segment resolution. Then the iterative adaptation of the intensities to be projected are scaled up from the segment resolution to the projector resolution.

In general, projectors have the advantage that they can actively produce edges on a surface, especially since they are mostly used in the dark. Therefore the projection has good contrast and contains easily identifiable edges. The shape of the object to be projected can also be selected such that the definition determination is precise. A camera image of the projection surface and thus of the projected object is well suited for measuring definition. The autofocus mechanisms identified in the prior art determine an individual definition for an entire camera image. However, for the inventive method pixel-wise definition values are required. The known method with structure light can be improved in this regard. One simple solution is to move the vertical and horizontal bars that a projector projects for the calibration pattern along the image axes in steps. After each step the calibration image recorded with the camera is evaluated, and a definition value can be determined for each camera pixel that the bar strikes. However, since the projection surfaces are not necessarily flat, and the projectors and cameras do not assume any prespecified position relative to one another and the surface, it is probable that the bars in the calibration image are crooked and that they are not parallel to the image coordinate axes of the camera. The two intensity distributions that result from a vertical and a horizontal search direction of the discrete calibration image are therefore different. In the worst case, that is, if a bar is orthogonal to an image axis, no distribution at all can be determined. Therefore a circular point surface is a geometry that is better suited for evaluating camera images. Projecting points generates dot-shaped reflections on the projection surface S. Using the illustration of a point in the camera image, at least one complete intensity distribution can be determined for each pass direction for the grid graphic. For projection surfaces S with less diffuse reflection, an inverse calibration pattern can be used that uses black points on a white background instead of white points on a black background. In such a case, after the calibration image is recorded it is inverted before it is supplied for further evaluation.

Figure 5:
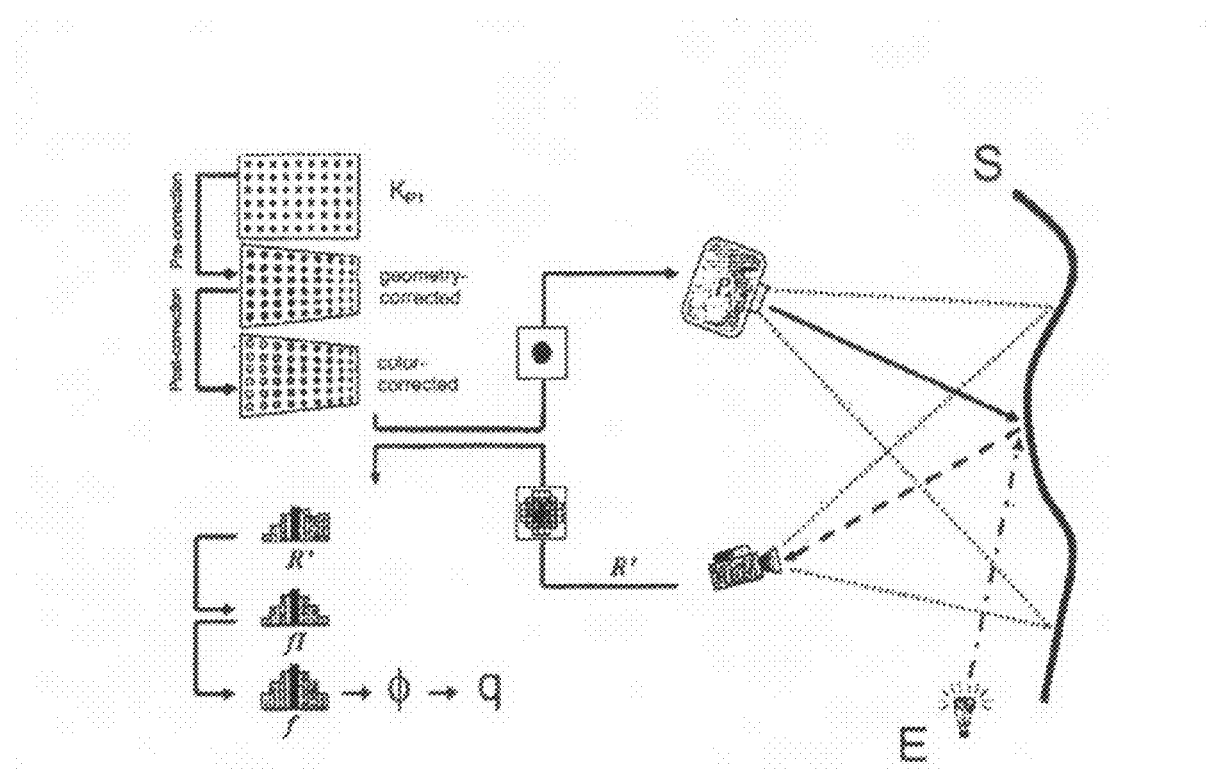
FIG. 5 is a schematic depiction of one calibration process for determining definitions.

In FIG. 5 a calibration process for determining the definition values $\Phi_{1,x,y}$ as a pixel-wise measure for the definition of the representation for the projector $P_1$ at all image points X of its projection field is illustrated schematically using the example of a projector $P_1$ and a camera C. Such a calibration process is performed sequentially for each of the projectors $P_i$ present. The other projectors $P_i$ are not shown here. The calibration process comprises a pre-correction step, a projection and recording step, and a post-correction step. The prepositions "before" and "after" refer to the step of projecting a calibration pattern $K_{P1}$ onto the projection surface S and subsequently recording the projection reflected there in a calibration image $K_{C1}$ by means of the camera C. For pixel-wise determination of the definition value $\phi_{1,x,y}$ a grid of points is used, for instance as calibration pattern $K_{P1}$, that is moved further in the projection step-wise parallel to the image axes and then recorded. Then there are a plurality of calibration images $K_{C1}$ that each contain the projected point grid with different positions.

The pre-correction includes correction steps that are performed before projection of the calibration pattern $K_{P1}$. The geometry correction explained in the foregoing is used so that the projected points are the same size everywhere in the recorded calibration image $K_{C1}$. For projecting the point grid, a texture is created that contains points equidistant from one another. Using the geometry correction, the texture is distorted such that all points in the calibration image $K_{P1}$ are the same size. It makes no difference what position or orientation the projectors $P_1$ have to others or to the projection surface S. The arbitrary position of the camera C leads to different size points on the projection surface. However, the same point distribution is projected onto a location of the projection surface S by each projector $P_i$ of an arrangement as long as they were focused the same. Another advantage is that the point grid in the calibration image $K_{P1}$ is parallel to the camera image axes. Thus it is easily possible to determine the positions of the individual points in order to evaluate their intensity distributions. The radiometric correction explained in the foregoing is used after the geometry correction directly on the texture that the point grid contains. All projected points are thus corrected such that they accept the same intensity in the calibration image $K_{C1}$ of the camera C, regardless of the form factor for projector $P_1$ or the material for the projection surface S.

Since one projector must radiate the intensity I=(R−EM)/FM so that the intensity is exactly R in a camera image, I can be greater than one if FM is small. A projector can only radiate 100% of maximum intensity. It must therefore be assured that I≦1. For this, a factor β can be selected, with β<1, that is applied to R so that I=((R·β)−EM)/FM and I≦1. The intensities in the camera image assume exactly the value γ, since all points in the grid in the starting image have the value I=1.0. The advantage is that β can be uniformly selected for all intensities I of all projectors, and thus the definition values for different projectors are comparable, even if they have for instance different illumination intensities or different form factors.

Post-correction corrects the intensity distribution in the calibration image $K_{C1}$ after projection and recording in terms of the color and texture of the projection surface S. This correction cannot be performed until after the projection and recording step, since the intensity distributions do not occur until on the projection surface S. However, during the correction care must be taken that the intensity $I_1$ that was radiated by the projector $P_1$ and that permits the distribution on the projection surface S to occur is already corrected according to $I_{x,y}=(R_{x,y}-EM_{x,y})/FM_x$ for the color or texture of the projection surface S. Thus, it is only possible to correct all values of an intensity distribution in the calibration image $K_{C1}$ if the intensities are led back to the original intensities I that were radiated by the projector $P_1$. It can be assumed that each intensity value of the distribution occurs from a factor f of the intensity originally radiated from the projector, that is, $I_f=I\cdot f$. $I_f$ is the intensity that the projector must radiate in order to create a specific value R for the intensity distribution in the calibration image $K_{C1}$. How many values the distribution of a point in the calibration image $K_{C1}$ comprises and how high the factor f of one of its values is depends on the focusing. Since the originally radiated intensity I is known, the factor f is determined in a first normalization of the intensity values $I_f$ of the calibration image $K_{C1}$ as $f=I_f/I$. The factors f can also be called intensities f that have been normalized for the first time. A new distribution results, comprising all factors f of the values of the intensity distribution recorded in the calibration image $K_{C1}$. In terms of definition or lack of definition, the distribution of the factors f behaves the same as the distribution of the intensities in the calibration image $K_{C1}$, but is completely corrected in terms of the color and texture of the projection surface S. In the subsequent analysis more exact definition values $\Phi_{1,x,y}$ can be attained in that each local maximum of the Gauss distribution and similar distributions present in the intensities f normalized for the first time are raised to a value of 1.0, the other intensity values or factors f belonging to the associated maximum being scaled with the same normalization factor so that they are present in a form that has been normalized twice.

The two-dimensional distribution of the normalized intensities is divided into scanning segments, and in the center of each is a point distribution. For this, the distribution of the intensities normalized for the first time or the distribution of the intensities normalized the second time can be used. The positions of the scanning segments are known from the geometry correction. The side length of the scanning segments can be adjusted for instance by the user, but is advantageously adjusted automatically to the spacing of the points in the grid. The entire contents of a search window thus contributes to the definition value of exactly one pixel in the calibration image $K_{C1}$, specifically the pixel that is located in the center of the scanning segment.

Now upon the distribution of the normalized intensities in a scanning segment an image decomposition using the moment retaining principle is performed that categorizes the intensity values of the scanning segment into a foreground and a background. The foreground contains values of higher intensity, and the background contains values of lower intensity. Since the size of a point on the projection surface depends on the definition, the results can be used as definition values. The pixel quantity thus ultimately comprises just a foreground with the mean intensity $g_w$ and the background with the mean intensity $g_b$. The definition value is determined by the portion of the pixels in the foreground $p_w$. The portion of pixels in the background is $p_b$, and $p_w+p_b=1$. Since the positions of the grid points are known from the geometry correction, a scanning segment can be placed about each grid point so that a plurality of scanning segments can be decomposed in parallel.

The scanning segments are displaced according to a stepwise displacement of the calibration pattern $K_{P1}$ using the respective calibration image $K_{C1}$ and the image decompositions are repeated for each position. Thus for each pixel from the camera perspective a respective definition value $\Phi_{1,x,y}$ is determined for the projector $P_1$.

After a corresponding calibration process has been performed for each available projector $P_i$, weighting factors $q_{i,x,y}$ for manipulating the pixel intensities I to be projected are determined from the determined definition values $\phi_{i,x,y}$ for combining the intensities $I_i$ to be projected. The mapping of the coordinates x, y from the camera image space into the projector image space is done by means of C2P mapping, which was determined for the geometry correction.

In the case of a weighted composition of pixels, which was described in the foregoing exemplary embodiments, the weighting factors $q_{i,x,y}$ are determined according to:

$$q_{i,x,y} = \frac{\phi_{i,x,y}}{\sum_j \phi_{j,x,y}},$$

whereby addition occurs across all projectors $P_i$. The intensities $I_i$ to be projected are in this case manipulated by pixel separately according to color channels according to:

$$I_i = q_{i,x,y} \frac{R - EM}{\sum_J FM_J}$$

If there is an exclusive composition of pixels that was described in the foregoing exemplary embodiments for the first alternative, the weighting factors $q_{i,x,y}$ are determined in a binary manner:

$$q_{i,x,y} = \begin{cases} 1 & f\ddot{u}r \phi_{i,x,y} >= \phi_{j,x,y} \\ 0 & sonst \end{cases}$$

the definition values $\Phi_{i,x,y}$ of the projectors $P_i$ being compared to one another by pair and by pixel. In this case, the intensities $I_i$ to be projected are manipulated by pixel separately according to color channels according to:

$$I_i = q_{i,x,y} \frac{R - EM}{FM_i}$$

In order to weaken optical artifacts that result from pixels that are from different projectors $P_i$ and that are not aligned precisely with one another or that have different sizes, the weighting factors $q_{i,x,y}$ or the parameter textures can be smoothed by means of a deep-pass filters such that soft edges and non-binary weighting factors $q_{i,x,y}$ result. Then the pixel intensities $I_i$ must be manipulated as for the weighted composition, whereby the exclusive weighting factors must be used according to normalized weights.

The weighted composition enables a higher light intensity of the projectors $P_i$ overall and thus a better perceivable representation of the digital images Z without artifacts at definition limits. However, it represents a compromise between representation definition and total light intensity. The pixel-wise multiplication occurs in both variants, exclusively and weighted, for reasons of speed advantageously as described in the foregoing by means of one pixel shader per projector $P_i$, the weighting factors $q_{i,x,y}$ being transferred in the form of parameter textures. In the case of the exclusive composition, alternative to the use of pixel shaders, for instance a stencil mask can be calculated for each projector that fades out pixels that are to be projected black. Alternatively, if there is a weighted composition, an alpha mask can be used in order to reduce the pixel intensities of less defined pixels to the degree determined.

Figure 6:
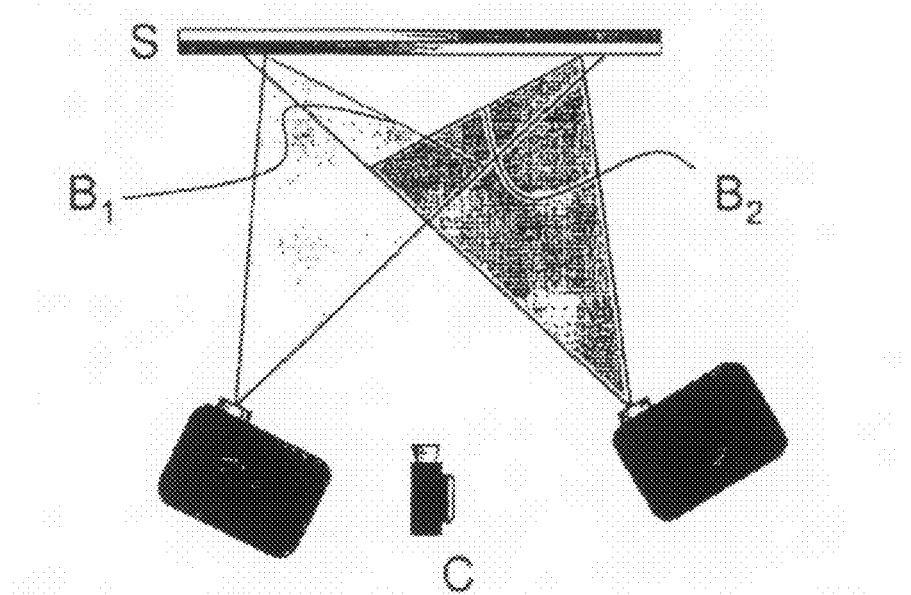
FIG. 6 is a first arrangement with a flat projection surface.

FIG. 6 illustrates a first, elementary arrangement for performing the inventive method with optimizing of the definition. It comprises two projectors $P_1$, $P_2$, are embodied as digital light projectors, and a camera C and a projection surface S. The projectors $P_1$, $P_2$ are oriented to the projection surface S at an angle so that their projection fields overlap in a multifocal projection. Projector $P_1$ is set such that it has a fixed focus an image plane $B_1$, and projector $P_2$ has a fixed focus on an image plane $B_2$. Due to the angled orientation of the projectors $P_1$, $P_2$, the image planes $B_1$, $B_2$ do not coincide with the plane of the projection surface S. That is, projector $P_1$ is able to map with definition pixels from its image buffer onto the projection surface S only on the left-hand edge of its projection field. Complementing this, projector $P_2$ is able to map with definition pixels from its image buffer onto the projection surface S only on the right-hand edge of its projection field. A first respective pixel from projector $P_1$ and a corresponding second pixel from projector $P_2$ are projected simultaneously onto each image point X of the projection surface S. In this example, the camera C has an orthogonal orientation to the projection surface S.

The inventive method now represents one digital image on the projection surface S by means of each projector $P_1$, $P_2$, both images being identical in this example, since both projection images completely overlap one another. For this, the digital images are copied into the respective image buffers of the projectors $P_1$, $P_2$. The intensities of the pixels to be projected are manipulated by means of a pixel shader in each projector $P_1$, $P_2$ using the two-dimensional maps of definition values $\phi_{1,x,y}$, $\phi_{2,x,y}$ allocated to each of the projectors $P_1$, $P_2$ such that a pixel that is as defined as possible or overlapping of two pixels that is as defined as possible is mapped on each image point X of the projection surface S. For this, a respective definition texture is transferred as parameter texture to each pixel shader at the beginning of the method. Stored in each definition texture are weighting factors $q_{i,x,y}$ determined pixel-wise from the definition values $\phi_{1,x,y}$, $\phi_{2,x,y}$, which factors the respective pixel shader multiplies pixel-wise by each pixel of the respective image buffer in order to thus manipulate the intensities I to be projected for each digital image.

On the left-hand edge of the projection surface S, only pixels from the projector $P_1$ are projected with the provided intensity, while on the right-hand edge of the projection surface S, only pixels from the projector $P_2$ are projected with the provided intensity. In the center of the projection surface S, at an image point X depending on what is specified, either as a first alternative exclusively the pixel of the projector $P_1$, $P_2$ can be projected in a direct comparison that has the absolute higher definition value compared to the corresponding pixel of the other projector $P_2$, $P_1$. In this first alternative, the definition textures are thus purely binary, the pixel-wise weighting factors assuming only values of 0 or 1. In a second alternative, the definition textures contain real weighting factors $q_{i,x,y}$, the weighting factors $q_{1,x,y}$ and $q_{2,x,y}$ from the two projectors adding up to a value of 1.0 for the pixels projected simultaneously on top of one another for any image point X.

As a result, each image point X of the representation has a minimum error in terms of its definition.

Figure 7:
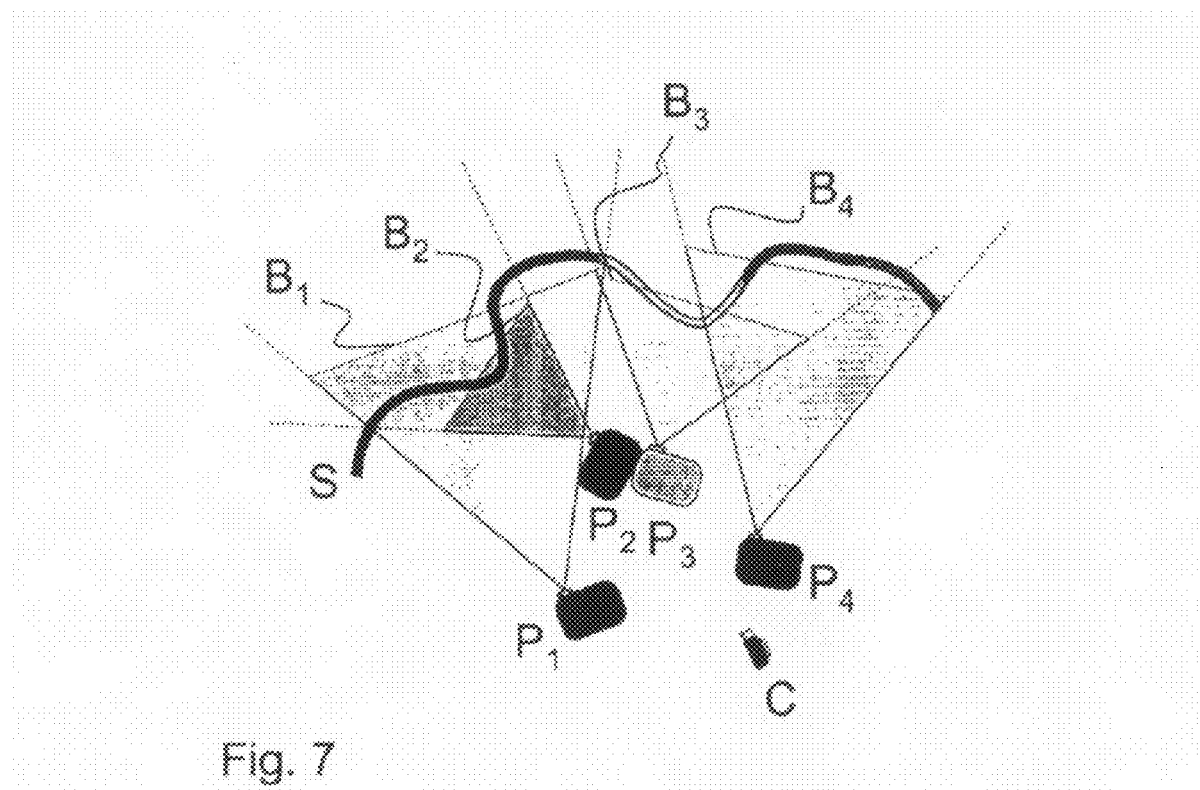
FIG. 7 is a second arrangement with an irregular projection surface.

FIG. 7 illustrates a second arrangement, comprising four projectors $P_i$ (i=1 ... 4) that are set to different image planes $B_i$ as well as a camera C and an extremely irregularly shaped projection surface S. The projection maps of each of the two projectors $P_i$ overlap one another at least partially, resulting in a multifocal projection. The projection surface S is illuminated everywhere by at least one of the projectors $P_i$. There are no obstructed areas. The representation method uses a discrete two-dimensional map of definition values $\phi_{i,xi,yi}$ for each projector Pi. Analogously to the previous exemplary embodiment, from these four definition textures are determined initially, one for each projector $P_i$. They contain weighting factors $q_{i,x,y}$. In a first embodiment, the weighting factors $q_{i,x,y}$ of the definition textures are purely binary so that for an image point X onto which two pixels can be projected from different projectors, after the pixel-wise multiplication of the definition textures by the respective image buffer intensities, only that pixel from that projector $P_i$ is projected that has the absolute highest definition value of all projectors $P_1$ in question in a direct comparison at image point X. In a second embodiment, the definition textures contain real weighting factors $q_{i,x,y}$, the weighting factors $q_{i,x,y}$ from a plurality of projectors $P_i$ for the pixels projected simultaneously onto one another for each image point X adding up to a value of 1.0. Although in this exemplary embodiment the projection fields from two projectors Pi overlap one another, performing the method is analogous for any desired number of projections fields that overlap one another and that are from a corresponding number of projectors $P_i$.

Figure 8:
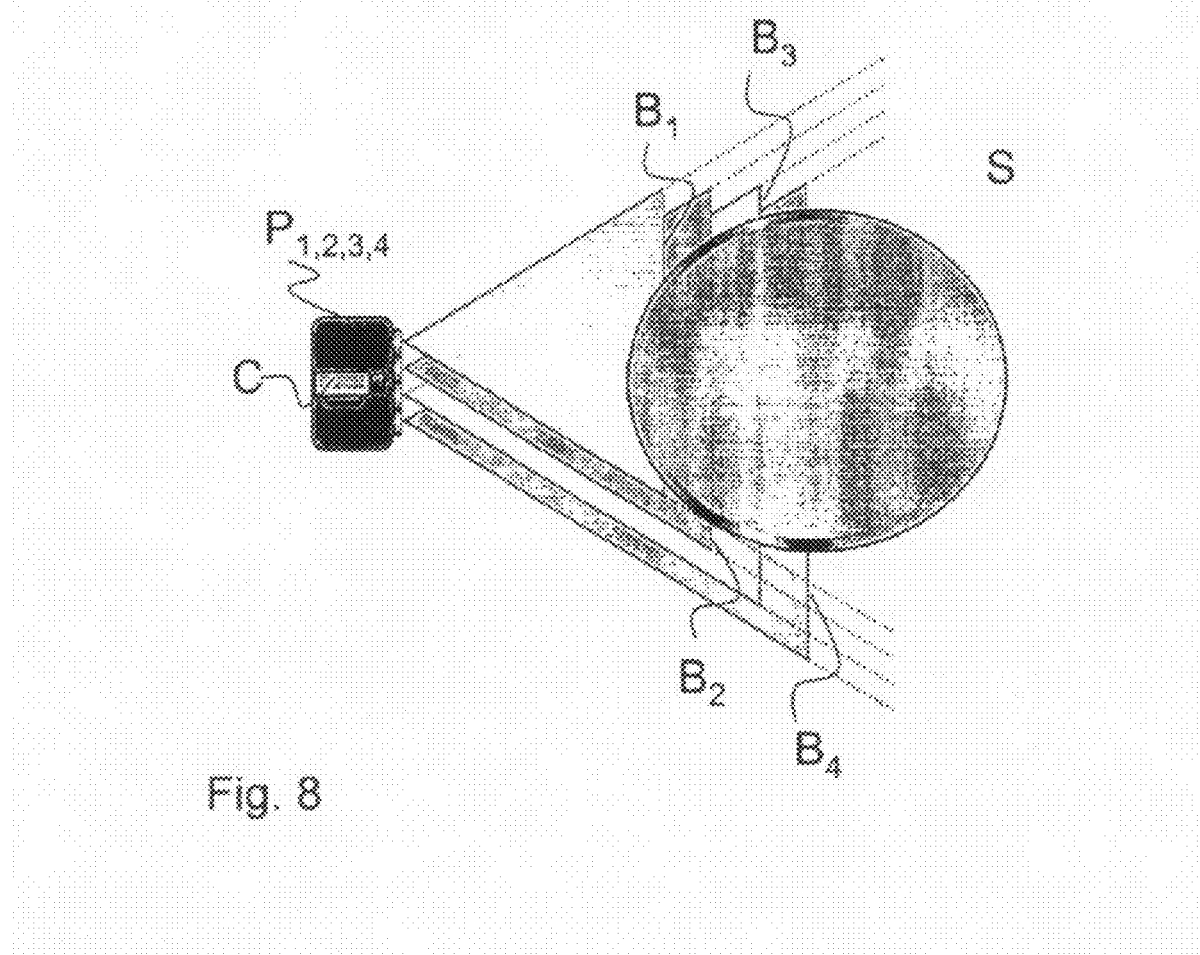
FIG. 8 is a third arrangement with a convex projection surface and a combined multi-projector.

FIG. 8 depicts a top view of a third arrangement that, like the second arrangement from FIG. 7, has four projectors $P_1$, but they are housed in a single equipment unit together with a camera C. The four projection fields are oriented offset in parallel and overlap one another. In terms of their focusing, the projectors $P_i$ are set for different, in this example parallel, equidistant image planes $B_i$. The projection surface S is the exterior surface of a cylindrical body. Analogously, in another embodiment the projection surface S could be on the interior surfaces of such a body or of a cupola.

By using the inventive representation method, all of the areas of the projection surface S that can be illuminated by the projectors are automatically represented with optimum definition by the equipment unit after the calibration processes for correcting geometry and color and for determining the definition values and corresponding conversion in the manipulation of the intensities to be projected. A projector $P_i$ projects only those pixels with unchanged intensity that strike the projection surface S in the area of its depth of field around its image plane $B_i$. All other pixels are set completely to black before the projection or are at least reduced in intensity. The digital images $Z_i$ to be projected are correspondingly mutually offset in the horizontal direction corresponding to the distances from the projector lens.

Figure 9:
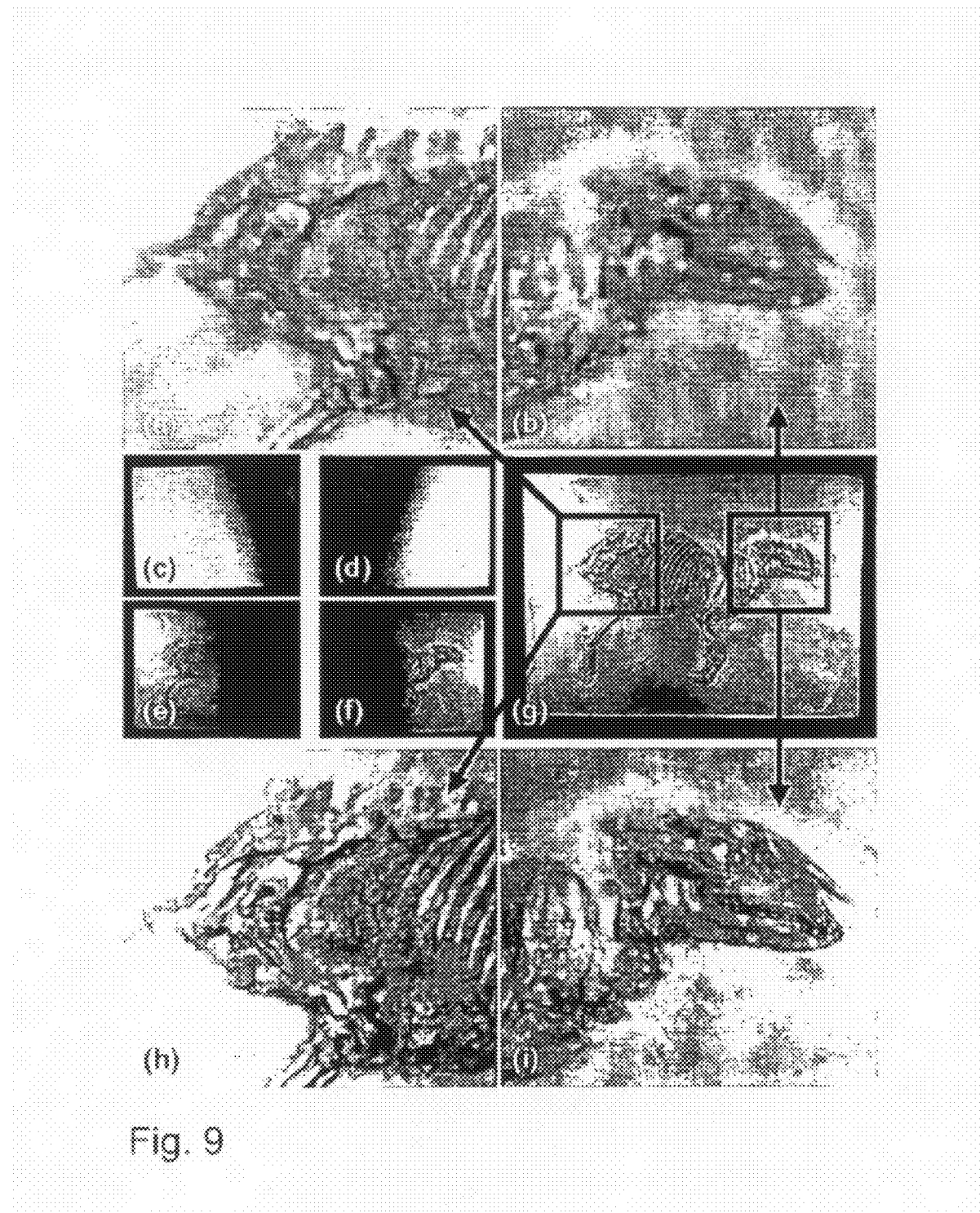
FIG. 9 depicts the results of the method with a flat projection surface.

FIGS. 9a and 9b depict different blurred parts of two uncorrected projections onto a flat projection surface in an arrangement in accordance with the exemplary embodiment in FIG. 1. FIGS. 9c and 9d depict mean gradients of the pixel-wise definition values $\phi_{1,x,y}$ and $\phi_{2,x,y}$, which were determined automatically with the inventive method. The left-hand projector $P_1$ loses definition from left to right, and the behavior of the right-hand projection $P_2$ is the reverse of this. The constant depth of field for the camera C intensifies the lack of definition of the measurements. These camera-specific focus-effects are the same for all projectors, however. Thus only relative definition values $\phi_{1,x,y}$ and $\phi_{2,x,y}$ can be determined that make it possible to compare projector contributions, but not absolute definition values. However, camera-specific focus effects do not play any role in the inventive method steps, so that relative definition values $\phi_{1,x,y}$ und $\phi_{2,x,y}$ are entirely enough for a defined representation.

FIGS. 9e and 9f represent contributions from projectors $P_1$, $P_2$ in an exclusive composition. Up to the center line of matching definition values $\phi_{1,x,y}$ und $\phi_{2,x,y}$ each projector $P_1$, $P_2$ projects the defined portion of the representation. FIG. 9g depicts the complete, simultaneous representation of both portions. It appears consistent and with maximum definition in all portions, as the excerpts in FIGS. 9h and 9i illustrate.

The definition values $\phi_{1,x,y}$ und $\phi_{2,x,y}$ are independent of the perspective. They are constant for each projector when they and the camera are fixed.

For instance four projectors can be operated by one computer with two graphics cards. Network communication for instance can be used for controlling more than four projectors. In arrangements with many projectors there is a high probability that the projectors, for instance based on different models, cover different color spaces in their depiction. For this purpose the method usefully includes steps for color space adaptation. The calibration process can be accelerated greatly if the grid of the point surfaces is projected and evaluated only one time, instead of displacing the point grid continuously. This is particularly true for geometrically less complex projection surfaces S whose surface changes not only just a little, that is, infrequently. In this case the missing definition values can be interpolated between the measured values. Pre-processing of the camera images used in the definition value measurement can increase the quality of the measurement. Pre-processing can for instance include smoothing the camera images in order to remove disturbances such as noise.

Figure 10:
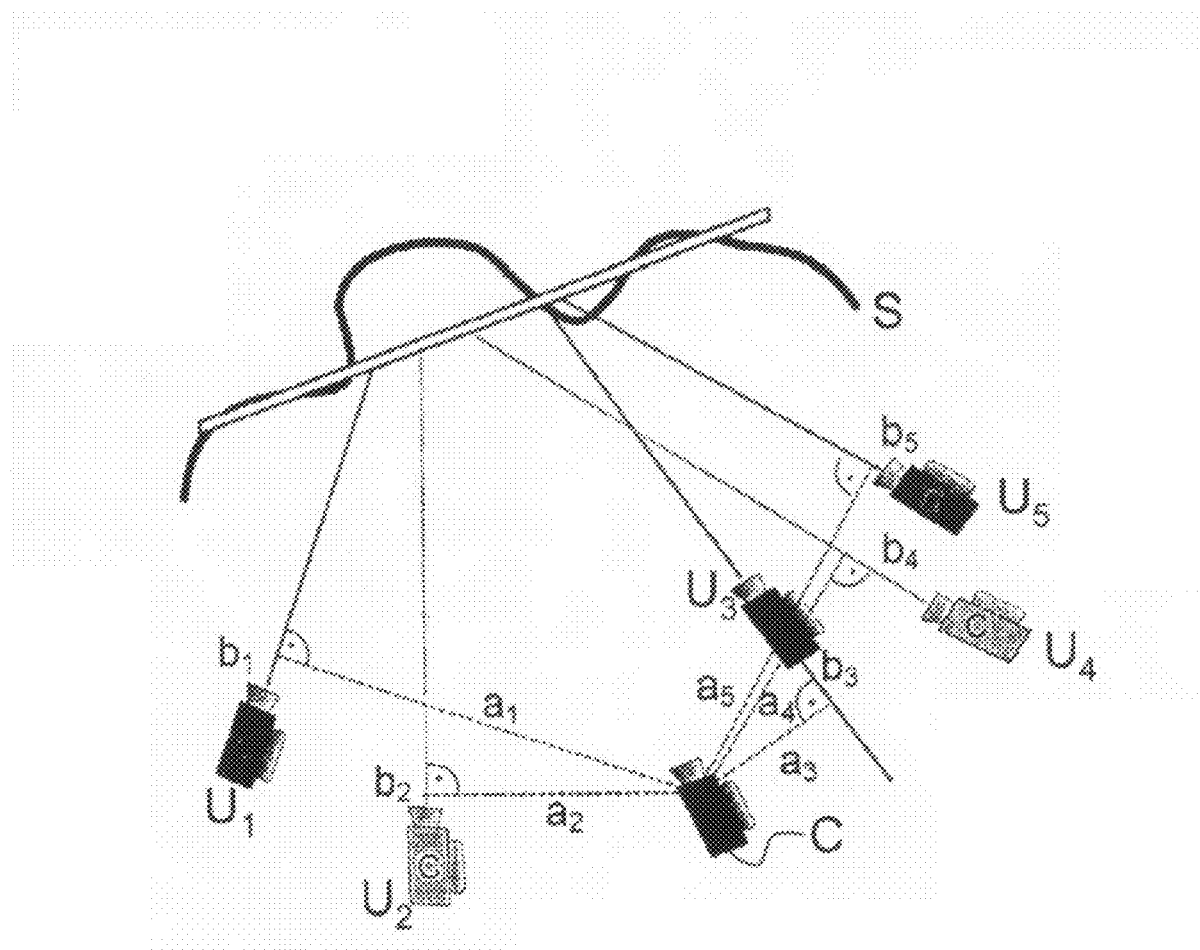
FIG. 10 is an arrangement for observer position-dependent representation with different camera positions during the calibration.

FIG. 10 depicts an arrangement for a representation depending on observer position. The arrangement includes a plurality of projectors $P_i$ that are not shown for simplifying the illustration. During the course of the calibration, the camera C is placed for instance at five different positions $U_g$ (g=1 ... 5) during five calibration processes and aligned onto the projection surface S. The position $U_g$ and each alignment of the camera C is determined for each radio transmission. In a discrete calibration process at each position $U_g$ a set of variables is determined for each projector $P_i$ in the manner described in the foregoing and each set of variables includes a pixel displacement auxiliary map $D_{Ugi}$, a surface auxiliary texture $T_{SUgi}$ representing the variable $FM_{Ugi}$, and an environmental illumination auxiliary texture $T_{EUgi}$ that represents the variable $EM_{Ugi}$. The set of variables determined is stored allocated to the appropriate position $U_g$. Definition $\phi_{i,x,y}$ and weighting factors $q_{i,x,y}$ only have to be determined once for defined, multifocal representation because they remain constant regardless of the position of the observer O as long as the geometric relationships between projection surface S and projectors $P_i$ are constant. Therefore the camera C can be arranged at any desired position for determining the definition $\phi_{i,x,y}$ or weighting factors $q_{i,x,y}$.

During the regular representation, the position and alignment of an observer O is followed for instance by means of so-called head-tracking. Using the observer position determined and the observer orientation determined, the pixel displacement map D required for the geometric warping and the color manipulation or correction is calculated by component for each projector $P_1$, before the rendering, using weighted interpolation between the pixel displacement auxiliary maps $D_{Ugi}$ stored for the positions $U_g$. The surface texture $T_S$ and the environmental illumination texture $T_E$ are calculated using weighted interpolation of the components $m_{Ugi}$ of the respective surface auxiliary textures $T_{Sug}$ or environmental illumination auxiliary texture $T_{Eug}$: $m_i = w_1 m_{U1i} + \ldots + w_5 m_{U5i}$. The weights $w_g$ are calculated from the following using intermediate weights $p_g$:

$$w_g = \left(1 - \frac{p_g}{p_{max}}\right) \frac{1}{p_g}$$

where $p_g = \alpha a_g + (1-\alpha) b_g$, whereby the weights $w_g$ are first normalized among one another before further use so that weights $w_g$ result from 0 to 1.0. For determining the distances $a_g$ and $b_g$ used for the intermediate weights $p_g$, the observer position determined is projected orthogonally onto the central projection direction of each position $U_g$, this resulting in auxiliary points $H_g$. The distances $a_g$ are each between the observer position determined and the respective auxiliary point $H_g$, their values being normalized among one another. The distances $b_g$ are each between the positions $U_g$ and the respective auxiliary point $H_g$ and their values are also normalized among one another. The factor $\alpha$ weights the distances, it can be for instance $\alpha=0.75$. Thus the rendering, including the geometry and color correction, is always correct with respect to the perspective of the observer position currently determined.

The method according to the invention can be used in all variations for stereoscopic representation with one or a plurality of projectors. For this, for instance, liquid crystal screens are synchronized in front of the projector objectives with active shutter glasses that are worn by the observer or observers. Stereoscopic representations, the image contents of which are rendered in real time, can be automatically adapted to the perspectives of the observer position followed. Polygon graphics rendered for example from three-dimensional data can be used for the stereoscopic representation.

| Reference list | |
| --- | --- |
| $P_{(i)}$ | Projector |
| $B_i$ | Image plane |
| S | Projection surface |
| X | Image point |
| C | Camera |
| $U_i$ | Position |
| $a_g$ | Distance between camera and projection surface |
| $b_g$ | Distance between camera and observer |
| Z | Digital image |
| $K_{P(I)}$ | Calibration pattern |
| $K_{C(I)}$ | Calibration image |
| D | Pixel displacement map |
| f | Normalized intensity |
| $\phi_{i,xi,yi}$ | Definition value |
| $q_{i,xi,yi}$ | Weighting factor |
| B | Image buffer |
| E | Environmental illumination |
| $I_i$ | Image/intensity that is projected/to be projected |
| R | Reflected intensity |
| t | Latency time |
| M | Material color |
| F | Form factor |
| $\alpha$ | Angle of incidence |
| r | Distance |
| $T_D$ | Pixel displacement texture |
| $T_S$ | Surface texture |
| $T_E$ | Environmental illumination texture |
| O | Observer |

The invention claimed is:

1. A method of representing a digital image on a projection surface, comprising:
    processing said digital image to create a processed image, said processing including geometric distortion of said digital image using a two-dimensional pixel displacement map that contains pixel-exact information about said projection surface and color manipulation using a two-dimensional surface texture of said projection surface;
    rendering at least a part of the processed image into an image buffer;
    projecting a content of the image buffer onto said projection surface by at least one projector;
    performing automatic calibration which includes projecting at least one projected calibration image onto said projection surface by said projector; and
    at least partially recording and digitizing said at least one projected calibration image by use of a camera.

2. A method according to claim 1, wherein the geometric distortion and color manipulation are performed using at least one pixel shader.

3. A method according to claim 1, wherein said camera is arranged at an observer position for the automatic calibration.

4. A method according to claim 1, further comprising:
    identifying an associated recorded pixel of a digitized recorded calibration image for at least one projected pixel of said at least one projected calibration image and a two-dimensional geometric displacement between said at least one projected pixel;
    determining said recorded pixel;
    storing said recorded pixel as an element of said two-dimensional pixel displacement map;
    and repeating said identifying, determining, and storing to achieve said two-dimensional pixel displacement map with pixel exact information for all pixels of the represented digital image.

5. A method according to claim 4, further comprising:
    at least partially projecting and recording multiple ones of said at least one projected calibration image successively, said projected calibration images containing temporally multiplexed stripe patterns; and
    determining recorded pixels associated with pixels to be projected by using said stripe patterns.

6. A method according to claim 4, further comprising:
    determining a mean value of two-dimensional geometric displacements belonging to a recorded pixel when there are more than one digitized recorded calibration image; and
    storing the mean value as an element of said two-dimensional pixel displacement map.

7. A method according to claim 1, further comprising:
    projecting at least one test image by use of said projector;
    repeatedly recording and digitizing images by use of said camera until said test image is identified in said digitized recorded images; and
    measuring a latency time between projection of said test image and identification of said test image.

8. A method according to claim 1, wherein:
    in the case of a single projector, a rectangle with very high intensity white color is projected as said projected calibration image by means of said projector, said projection surface not being illuminated with environmental illumination; and
    a recorded calibration image digitized thereby being used as said two-dimensional surface texture with pixel-exact information of said projection surface.

9. A method according to claim 1, wherein:
in the case of more than one said projector, a rectangle with very high intensity white color is projected sequentially as said projected calibration image by means of each said projector, said projection surface not being illuminated with environmental illumination; and
a recorded calibration image digitized thereby being used as said two-dimensional surface texture of said projection surface for said respective one of said projector.

10. A method according to claim 1, wherein a black calibration image is projected by said projector and is recorded and digitized by said camera, said digitized recorded calibration image being used as an environmental illumination texture for said color manipulation.

11. A method according to claim 1, wherein a digitized recorded calibration image used for a surface texture or for an environmental illumination texture is initially distorted into a perspective of said projector using said two-dimensional pixel displacement map and/or an associated pixel displacement texture.

12. A method according to claim 1, wherein a lens distortion of said camera is compensated after the digitizing and recording therein by a computer.

13. A method according to claim 1, wherein recordings of said camera are provided with a mask.

14. A method according to claim 1, wherein said calibration is performed repeatedly, said camera being arranged in a different position for each calibration process, and said pixel displacement map determined for each position is stored as a pixel displacement auxiliary map and said surface texture determined is stored as a surface auxiliary texture allocated to an associated position.

15. A method according to claim 14, wherein a position of said observer is determined dynamically prior to said geometric distortion and color manipulation and said pixel displacement map and said surface texture are determined using said pixel displacement auxiliary maps determined for said different camera positions and said position determined for said surface auxiliary textures.

16. A method according to claim 15, wherein said pixel displacement map is determined in that there is weighted interpolation between said pixel displacement auxiliary maps determined for said different camera positions, and in that said surface texture is determined in that there is weighted interpolation between said surface auxiliary textures determined for said different camera positions.

17. A method according to claim 1, wherein:
said at least one projector includes at least two projectors;
a plurality of digital images are represented on said projection surface by said projectors that are set for different image planes;
contents of appropriate image buffers that contain intensities of pixels to be projected are projected in areas of said projection surface; and
for one image point of said projection surface onto which point a plurality of pixels are simultaneously projected from different ones of said projectors, said intensities to be projected for said pixels using respective ones of said projectors are manipulated using definition values for individual respective pixels.

18. A method according to claim 17, wherein said pixels are manipulated using said definition values by use of at least one pixel shader.

19. A method according to claim 18, wherein in one of said recorded calibration images an intensity of a pixel is normalized a first time in that it is placed in relation to the intensity of the corresponding pixel in said projected calibration pattern.

20. A method according to claim 18, wherein said calibration pattern for one said projector is displaced in multiple steps and an associated calibration image is recorded after each of said steps.

21. A method according to claim 18, wherein a matrix of circular points is used for said calibration pattern.

22. A method according to claim 18, further comprising correcting said calibration pattern in terms of geometry and color with respect to the properties of said projection surface individually for each said projector before the projection.

23. A method according to claim 17, wherein said pixels which are manipulated using said definition values occurs in that of a plurality of pixels that can be projected from different projectors onto a same image point of said projection surface, the intensity of those with the highest of said definition values remains unchanged, while the rest of said pixels are darkened.

24. A method according to claim 23, wherein a plurality of intensities that have been normalized for a first time and that are from a calibration image are normalized with one another a second time.

25. A method according to claim 23, wherein a definition value is determined from normalized intensities of one of said at least one calibration image by means of image decomposition using a moment retaining principle.

26. A method according to claim 25, wherein said image decomposition is performed within a two-dimensional scanning segment of the associated calibration image.

27. A method according to claim 17, wherein said manipulating using said definition values occurs in that the intensities of a plurality of pixels that can be projected from different projectors onto a same image point of said projection surface are scaled in a weighted manner using ones of said definition values associated therewith.

28. A method according to claim 17, wherein said definition values of said pixels are determined in a calibration process, for which purpose a calibration pattern is projected successively by means of each said projector and the projections reflected by said projection surface are recorded in appropriate calibration images by said camera.

29. A method according to claim 1, wherein during color manipulation, mutual illumination of different projection surface segments is compensated by form factors corresponding to various projection surface segments.

30. A method according to claim 29, wherein said compensation is performed iteratively, an intensity to be projected onto a projection surface segment being manipulated using a reflected scatter intensity.

31. An apparatus for representing a digital image on a projection surface, comprising:
a control unit;
an image buffer;
at least one projector; and
a camera, said projector and said camera being coupled to the control unit that processes said digital image during a rendering process, said control unit configured to conduct geometric distortion using a two-dimensional pixel displacement map that contains pixel-exact information about said projection surface and to manipulate color using a two-dimensional surface texture of said projection surface, at least a part of the processed image being rendered into the image buffer;

wherein the control unit is further configured to perform calibration for the projector to project at least one projected calibration image onto said projection surface; and wherein the camera at least partially records and digitizes said at least one projected calibration image.

32. An apparatus according to claim 31, wherein said control unit is connected to an image-producing source that delivers to said control unit digital images that are to be represented on said projection surface after said calibration.

33. An apparatus according to claim 31, wherein during color manipulation, said control unit compensates mutual illumination of various projection surface segments using form factors corresponding to said projection surface segments.

34. An apparatus according to claim 31, wherein said at least one projector includes at least two projectors arranged to project from different directions, illuminated areas of said projectors overlapping or each illuminating a portion of said projection surface independent of one another.

35. An apparatus according to claim 31, wherein said control unit includes an image buffer that is connected to at least one programmable pixel shader that geometrically distorts said digital image when rendering into said image buffer.

36. An apparatus according to claim 31, wherein said at least one projector includes at least two projectors which are oriented to respective projection fields thereof at an angle, said respective projection fields overlapping in a multifocal projection, and a first of said projectors being set having a fixed focus on a first image plane and second of said projectors being set having a fixed focus on a second image plane.

37. An apparatus according to claim 31, wherein said at least one projector includes four projectors which are set to different image planes, respective projection fields of every two of said four projectors overlap one another at least partially.

38. An apparatus according to claim 31, wherein said at least one projector includes four projectors which are arranged in a single equipment unit, four respective projection fields of the four projectors being oriented offset in parallel and overlapping one another.

39. An apparatus according to claim 38, wherein said camera is arranged in or on said equipment unit.

40. An apparatus according to claim 31, wherein said camera is detachably attached to other elements of said apparatus.

* * * * *